US012682877B2

(12) United States Patent
Wen

(10) Patent No.: US 12,682,877 B2
(45) Date of Patent: Jul. 14, 2026

(54) NOISE REDUCTION PARAMETER SETTING METHOD AND APPARATUS, EARPHONE DEVICE AND STORAGE MEDIUM

(71) Applicant: GOERTEK TECHNOLOGY CO., LTD., Qingdao (CN)

(72) Inventor: Xiaofeng Wen, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 190 days.

(21) Appl. No.: 18/631,158

(22) Filed: Apr. 10, 2024

(65) Prior Publication Data

US 2024/0257795 A1 Aug. 1, 2024

Related U.S. Application Data

(63) Continuation of application No. PCT/CN2021/139025, filed on Dec. 17, 2021.

(30) Foreign Application Priority Data

Nov. 26, 2021 (CN) ........................ 202111423276.7

(51) Int. Cl.
*G10K 11/178* (2006.01)

(52) U.S. Cl.
CPC .. *G10K 11/17815* (2018.01); *G10K 11/17881* (2018.01); *G10K 2210/1081* (2013.01);
(Continued)

(58) Field of Classification Search
CPC ..... G10K 11/17815; G10K 2210/1081; G10K 2210/3026; G10K 2210/3027;
(Continued)

(56) References Cited

U.S. PATENT DOCUMENTS

2006/0013079 A1* 1/2006 Rekimoto ............ H04R 1/1041 369/30.01
2013/0315410 A1 11/2013 Annunziato et al.
2017/0200444 A1* 7/2017 O'Connell ....... G10K 11/17833

FOREIGN PATENT DOCUMENTS

CN 110972014 A 4/2020
CN 113299262 A 8/2021
(Continued)

OTHER PUBLICATIONS

First Office Action in Corresponding Chinese Application No. 202111423276.7, dated Nov. 3, 2022; 14 pgs.
(Continued)

*Primary Examiner* — Kile O Blair
(74) *Attorney, Agent, or Firm* — HAUPTMAN HAM, LLP

(57) ABSTRACT

Disclosed are a noise reduction parameter setting method and apparatus, an earphone device and a storage medium. The method includes: obtaining, via the earphone device, the environmental signal picked up by the feedforward microphone and the noise signal picked up by the feedback microphone; and calculating the energy difference value between the environmental signal and the noise signal; obtaining the preset target noise reduction parameter value corresponding to the energy difference value, and setting the noise reduction parameter for the active noise reduction mode in the earphone device according to the target noise reduction parameter value.

8 Claims, 8 Drawing Sheets

(52) U.S. Cl.
CPC .............. *G10K 2210/30231* (2013.01); *G10K 2210/3026* (2013.01); *G10K 2210/3027* (2013.01)

(58) Field of Classification Search
CPC ......... G10K 11/17881; G10K 11/1783; G10K 11/17833; G10K 11/17835
See application file for complete search history.

(56) References Cited

FOREIGN PATENT DOCUMENTS

| | | | |
|---|---|---|---|
| CN | 113507662 | A | 10/2021 |
| CN | 113676803 | A | 11/2021 |
| CN | 113920975 | A | 1/2022 |
| WO | 2013177282 | A1 | 11/2013 |

OTHER PUBLICATIONS

Grant Notification in Corresponding Chinese Application No. 202111423276.7, dated Apr. 26, 2023; 5 pgs.
International Search Report and Written Opinion in Corresponding International Application No. PCT/CN2021/139025, dated Aug. 26, 2022; 14 pgs.

* cited by examiner

NOISE REDUCTION PARAMETER SETTING METHOD AND APPARATUS, EARPHONE DEVICE AND STORAGE MEDIUM

CROSS-REFERENCE TO RELATED APPLICATIONS

The present application is a continuation application of International Application No. PCT/CN2021/139025, filed on Dec. 17, 2021, which claims priority to Chinese patent application Ser. No. 20/2111423276.7, filed on Nov. 26, 2021. The disclosures of the above-mentioned applications are incorporated herein by reference in their entireties.

TECHNICAL FIELD

The present application relates to the technical field of earphones, and in particular to a noise reduction parameter setting method and apparatus, an earphone device and a storage medium.

BACKGROUND

Currently, active noise reduction technology continues to develop and mature, and headphones with active noise reduction functions are also widely used. The principle of active noise reduction technology is to pick up the noise in the external environment through a microphone, and use the noise reduction system to generate sound waves with the same amplitude and reverse phase as the external noise, which are played by the speakers to offset the external environmental sound signals, thereby achieving the noise reduction effect.

When the earphone is in the in-ear state, the noise signal picked up by the feedforward microphone of the earphone is the environmental noise signal (also called environmental signal), and the noise signal picked up by the feedback microphone of the earphone is the noise signal isolated by the earphone. The active noise reduction earphones is designed by measuring the energy difference value between the environmental signal picked up by the feedforward microphone of the headphone and the noise signal picked up by the feedback microphone after being isolated by the earphone in a laboratory environment and setting the noise reduction parameters according to the measured energy difference value. However, when the earphones are used, due to differences in the auricles and external ear canals between different users, different wearing habits of users, etc., the coupling state between the earphones and the user's ear canal during use is different, and the energy difference value between the environmental noise picked up by the microphone and the noise signals isolated by the earphones is different from the data in the laboratory design stage. This will cause the active noise reduction effect experienced by the user to fail to achieve the expected design effect, affecting the user experience.

SUMMARY

The main purpose of the present application is to provide a noise reduction parameter setting method and apparatus, an earphone device and a storage medium, aiming to solve the problem that the coupling state between the earphone device and the user's ear canal does not meet expectations due to different wearing habits of users or differences in ear canals, resulting in the active noise reduction effect experienced by users cannot achieve the expected design effect, and affecting the user experience.

In order to achieve the above purpose, the present application provides a noise reduction parameter setting method. The method is applied to an earphone device. The earphone device includes a feedforward microphone and a feedback microphone. The method includes:

- obtaining an environmental signal picked up by the feedforward microphone and a noise signal picked up by the feedback microphone;
- calculating an energy difference value between the environmental signal and the noise signal; and
- obtaining a preset target noise reduction parameter value corresponding to the energy difference value, and setting a noise reduction parameter for an active noise reduction mode in the earphone device according to the target noise reduction parameter value.

In an embodiment, obtaining the preset target noise reduction parameter value corresponding to the energy difference value includes:

- determining a target difference value level to which the energy difference value belongs from a plurality of preset difference value levels; and
- obtaining a preset noise reduction parameter value corresponding to the target difference value level as the target noise reduction parameter value.

In an embodiment, after calculating the energy difference value between the environmental signal and the noise signal, the method further includes:

- detecting whether the energy difference value is less than a preset minimum threshold;
- obtaining the preset target noise reduction parameter value corresponding to the energy difference value, and setting the noise reduction parameter for the active noise reduction mode in the earphone device according to the target noise reduction parameter value, in response to that the energy difference value is greater than or equal to the preset minimum threshold; or
- outputting preset prompting information to prompt a user to adjust a wearing state of an earphone, in response to that the energy difference value is less than the preset minimum threshold.

In an embodiment, calculating the energy difference value between the environmental signal and the noise signal includes:

- performing spectrum analysis on the environmental signal to obtain a first spectrum, and performing the spectrum analysis on the noise signal to obtain a second spectrum; and
- calculating a difference value between an energy value of each frequency point in the first spectrum and an energy value of a corresponding frequency point in the second spectrum respectively, and using the difference value corresponding to each frequency point as the energy difference value between the environmental signal and the noise signal.

In an embodiment, the preset minimum threshold includes a threshold corresponding to each frequency point, and detecting whether the energy difference value is less than the preset minimum threshold includes:

- detecting whether the difference value of each frequency point is less than the threshold of the corresponding frequency point;
- in response to that the difference value at each frequency point is less than the threshold of the corresponding frequency point, determining that the energy difference value is less than the preset minimum threshold; or in response to that at least one of the difference values at the frequency points is greater than or equal to the threshold of corresponding one of the frequency points, determining that the energy difference value is greater than the preset minimum threshold.

In an embodiment, determining the target difference value level to which the energy difference value belongs from the plurality of preset difference value levels includes:

comparing the difference value at each frequency point with a difference value interval of the corresponding frequency point at a preset difference value level to count a number of frequency points where the difference value falls within the corresponding difference value interval; and using a difference value level with a largest number of corresponding frequency points among the plurality of preset difference value levels as the target difference value level to which the energy difference value belongs.

In an embodiment, before obtaining the environmental signal picked up by the feedforward microphone and the noise signal picked up by the feedback microphone, the method further includes:

obtaining collection values of multiple contact sensors provided on an earphone wearing part of the earphone device;

detecting whether each of the collection values is greater than a preset threshold; and in response to that at least one of the collection values is greater than the preset threshold, obtaining the environmental signal picked up by the feedforward microphone and the noise signal picked up by the feedback microphone.

In order to achieve the above purpose, the present application also provides a noise reduction parameter setting apparatus, provided in an earphone device including a feedforward microphone and a feedback microphone, the noise reduction parameter setting apparatus includes:

an obtaining module, configured to obtain an environmental signal picked up by the feedforward microphone and a noise signal picked up by the feedback microphone;

a calculation module, configured to calculate an energy difference value between the environmental signal and the noise signal; and a setting module, configured to obtain a preset target noise reduction parameter value corresponding to the energy difference value, and set a noise reduction parameter for an active noise reduction mode in the earphone device according to the target noise reduction parameter value.

In order to achieve the above purpose, the present application also provides an earphone device, the earphone device includes a memory, a processor and a noise reduction parameter setting program stored in the memory and executable on the processor, and the noise reduction parameter setting method as described above is implemented when the noise reduction parameter setting program is executed by the processor.

In addition, In order to achieve the above purpose, the present application also provides a non-transitory computer-readable storage medium, a noise reduction parameter setting program is stored on the non-transitory computer-readable storage medium, and the noise reduction parameter setting method as described above is implemented when the noise reduction parameter setting program is executed by a processor.

In the present application, the environmental signal picked up by the feedforward microphone and the noise signal picked up by the feedback microphone in the earphone device are obtained, the energy difference value between the environmental signal and the noise signal is calculated to obtain the preset target noise reduction parameter value corresponding to the energy difference value, and the noise reduction parameter for the active noise reduction mode of the earphone device is set according to the target noise reduction parameter value. The noise reduction parameter value corresponding to different energy difference values is set in advance, and the energy difference value between the environmental signal and the noise signal actually picked up by the earphone device is used to select the corresponding noise reduction parameter value to set the noise reduction parameter for the active noise reduction mode, so that even if the coupling state of the earphone device and the user's ear canal is different due to different wearing habits of users and differences in ear canals, it is also possible to achieve the expected active noise reduction effect by corresponding noise reduction parameter value, improving the user experience of using the active noise reduction function of earphones.

The realization of the purpose, functional features and advantages of the present application will be further described in conjunction with the embodiments, with reference to the accompanying drawings.

DETAILED DESCRIPTION OF THE EMBODIMENTS

It should be understood that the specific embodiments described here are only used to explain the present application and are not used to limit the present application.

Figure 1:
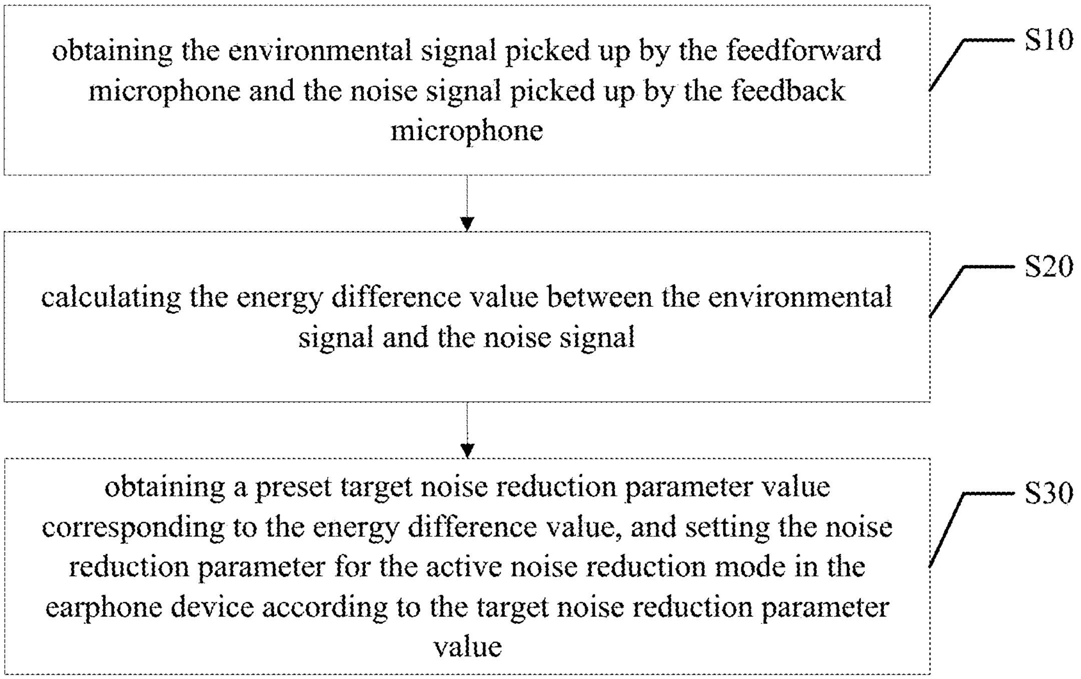
FIG. 1 is a schematic flow chart of a noise reduction parameter setting method according to a first embodiment of the present application.

As shown in FIG. 1, FIG. 1 is a schematic flow chart of a noise reduction parameter setting method according to a first embodiment of the present application The embodiment of the present application provides an embodiment of the noise reduction parameter setting method. It should be noted that although the logical order is shown in the flow chart, in some cases, the steps shown or described can be performed in a different order than here. The noise reduction parameter setting method of the present application is applied to an earphone device, which includes a feedforward microphone and a feedback microphone. In this embodiment, the noise reduction parameter setting method includes:

step S10, obtaining the environmental signal picked up by the feedforward microphone and the noise signal picked up by the feedback microphone.

The feedforward microphone can be provided on a side of the earphone device that is in contact with the external environment to collect the environmental signal. The feedback microphone can be provided in a cavity formed by the earphone device and the user's ear canal to collect residual noise signals of the environmental signals that are isolated by the earphone device and then reach the user's ear canal. When it is necessary to set the noise reduction parameters for the active noise reduction mode in the earphone device, the earphone device can obtain the environmental signal picked up by the feedforward microphone and the noise signal picked up by the feedback microphone. The specific parameter items included in the noise reduction parameters can be set according to specific needs, and are not limited here. For example, the specific parameter items can include filter coefficients of feedforward filters and feedback filters, gain coefficients of speakers, etc.

When the speaker of the earphone device plays an audio signal, the feedback microphone will also pick up the audio signal played by the speaker. At this time, the earphone device can remove the audio signal played by the speaker from the sound signal picked up by the feedback microphone and obtain the noise signal. When the speaker of the earphone device does not play the audio signal, the sound signal picked up by the feedback microphone can be used as the noise signal.

The way in which the earphone device sets the noise reduction parameters of the active noise reduction mode is not limited in this embodiment. In an embodiment, the earphone device can automatically set the noise reduction parameters at a scheduled time when it is in a working state (for example, when connected to the main device) or when it is detected that it is being worn, for example, once every 1 minute. The interval duration can further be customized by users, providing a sensitivity adjustment function with adaptive noise reduction parameters. In another embodiment, the earphone device can set the noise reduction parameter when receiving a noise reduction parameter setting instruction triggered by operating the earphone device or a user terminal connected to the earphone device by the user. Alternatively, the earphone device can set the noise reduction parameter when receiving an instruction to enable active noise reduction mode and perform active noise reduction according to the set noise reduction parameter values.

Whether the earphone device is in a wearing state can be detected by means of an infrared sensor, a distance sensor, etc., which are not limited in this embodiment.

Step S20, calculating the energy difference value between the environmental signal and the noise signal.

After the earphone device obtains the environmental signal and the noise signal, the energy difference value between the environmental signal and the noise signal can be calculated. The smaller the energy difference value between the environmental signal and the noise signal, the more residual noise the environmental signal reaches the user's ear canal after being isolated by the earphone device, and the worse the isolation effect. At this time, the coupling degree (fit degree) between the earphone device and the user's ear canal is lower. The greater the energy difference value between the environmental signal and the noise signal, the less residual noise the environmental signal reaches the user's ear canal after being isolated by the earphone device, and the worse the isolation effect. At this time, the coupling degree between the earphone device and the user's ear canal is higher. That is, the energy difference value between the environmental signal and the noise signal reflects the coupling degree between the earphone device and the user's ear canal, and reflects the passive sound isolation effect of the earphone device.

There are many ways to calculate the energy difference value between the environmental signal and the noise signal, which are not limited in this embodiment. For example, in an embodiment, the energy values of each frequency point of the environmental signal can be averaged, the energy values of each frequency point of the noise signal can be averaged, then the difference value between two average values can be calculated, and the difference value can be used as the energy difference value between the environmental signal and the noise signal. In another embodiment, the difference value between the energy value of a certain frequency point in the environmental signal and the energy value of the corresponding frequency point in the noise signal can be calculated, and the difference value can be used as the energy difference value between the environmental signal and the noise signal.

Step S30, obtaining a preset target noise reduction parameter value corresponding to the energy difference value, and setting the noise reduction parameter for the active noise reduction mode in the earphone device according to the target noise reduction parameter value.

Noise reduction parameter values corresponding to different energy difference values can be set in advance. The noise reduction parameter value is the specific value of the noise reduction parameter. When the coupling degree between the earphone device and the user's ear canal is different, the optimal value of the noise reduction parameter is different. In the experimental design stage, the coupling state between the earphone device and the test ear can be adjusted to make the energy difference value between the environmental signal and the noise signal reach different levels, and then the optimal noise reduction parameter values can be set through experimental testing for different energy difference values. The correspondence between the energy difference value and the noise reduction parameter value is built into the earphone device. After the earphone device obtains the actual energy difference value, the noise reduction parameter value corresponding to the energy difference value can be obtained according to the built-in correspondence, and the obtained noise reduction parameter value is used as the target noise reduction parameter value.

After determining the target noise reduction parameter value, the earphone device can set the noise reduction parameters for the active noise reduction mode in the earphone device according to the target noise reduction parameter value, that is, assign the noise reduction parameter for the active noise reduction mode to the target noise reduction parameter value, so that when the active noise reduction mode is started, the earphone device can perform active noise reduction according to the target noise reduction parameter value. In a specific implementation, when the noise reduction parameter value for the current active noise reduction mode is the same as the target noise reduction parameter value, the earphone device can use the target noise reduction parameter value to reassign the noise reduction parameter for the active noise reduction mode, or keep the current noise reduction parameter value unchanged.

In an embodiment, the noise reduction parameter for the active noise reduction mode can be set to a default noise reduction parameter value, and the default noise reduction parameter value can be used when the earphone device leaves the factory.

Figure 2:
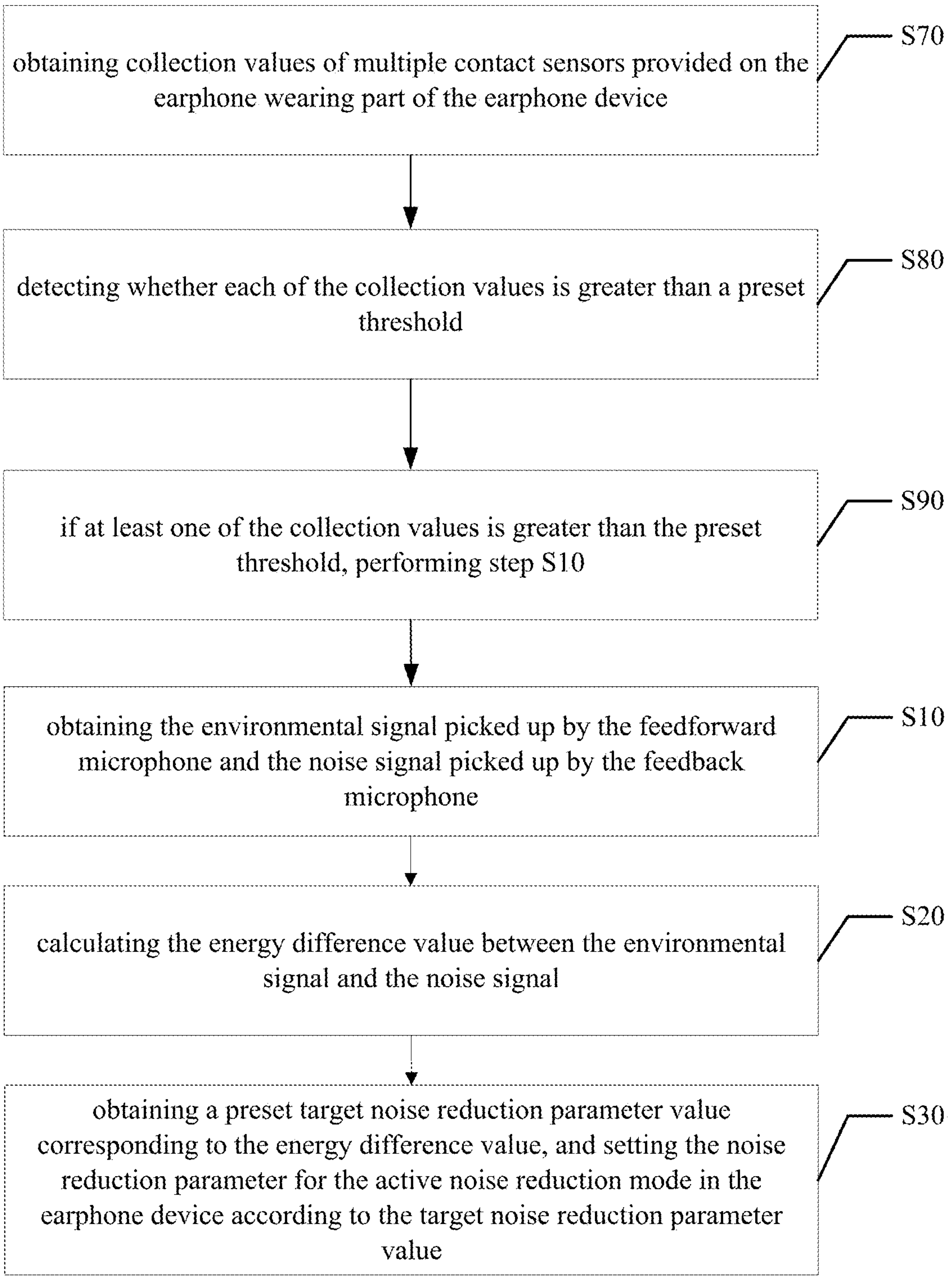
FIG. 2 is a schematic flow chart of a noise reduction parameter setting method according to another embodiment of the present application.

Further, in another embodiment, as shown in FIG. 2, before step S10, the method also includes:

step S70, obtaining collection values of multiple contact sensors provided on the earphone wearing part of the earphone device.

Multiple contact sensors can be provided on the earphone wearing part of the earphone device. The contact sensor can be set at a position where the earphone wearing part is in contact with the user's ear when the earphone device is in a wearing state. For example, multiple contact sensors can be evenly distributed on a surface where the earphone wearing part is in contact with the user's ear, in order to detect whether the user is wearing the earphone device normally from various angles. The earphone wearing part is the part opposite to the user's ear canal when the earphone device is worn. The contact sensor can be a capacitive sensor or a pressure sensor, which is not limited in this embodiment. The collection value of the capacitive sensor is a capacitance value, and the collection value of the pressure sensor is a pressure value.

The earphone device can acquire collection values of multiple contact sensors provided on the earphone wearing part. In a specific implementation, the earphone device can regularly obtain the collection value of the contact sensor when it is in the working state.

Step S80, detecting whether each of the collection values is greater than a preset threshold.

After obtaining the collection values, the earphone device can detect whether each collection value is greater than the preset threshold. The preset threshold can be set as needed. When the collection value of the contact sensor is greater than the preset threshold, it means that the earphone device at the contact sensor is in normal contact with the user's ear canal.

Step S90, if at least one of the collection values is greater than the preset threshold, performing step S10.

If it is detected that at least one of the collection values is greater than the preset threshold, it is determined that the earphone device is in the wearing state. At this time, the earphone device can perform step S10, that is, obtain the environmental signal picked up by the feedforward microphone and the noise signal picked up by the feedback microphone, and then the noise reduction parameters are set. Alternatively, in other embodiments, it is determined that the earphone device is in the wearing state only when at least half of the collection values are greater than the preset threshold, so as to avoid misjudgment that the earphone device is in the wearing state when the user accidentally touches the earphone.

In this embodiment, by acquiring the environmental signal picked up by the feedforward microphone and the noise signal picked up by the feedback microphone in the earphone device and calculating the energy difference value between the environmental signal and the noise signal, the preset target noise reduction parameter value corresponding to the energy difference value is obtained. The noise reduction parameter for the active noise reduction mode of the earphone device is set according to the target noise reduction parameter value. The noise reduction parameter values corresponding to different energy difference values are set in advance, and the corresponding noise reduction parameter value is selected according to the energy difference value between the environmental signal and the noise signal actually picked up by the earphone device to set the noise reduction parameter for the active noise reduction mode, so that even when the coupling state of the earphone device and the user's ear canal is different due to different wearing habits of users and differences in ear canals, the expected active noise reduction effect can also be achieved through the corresponding noise reduction parameter value, improving the user's experience of using the earphone's active noise reduction function.

Figure 3:
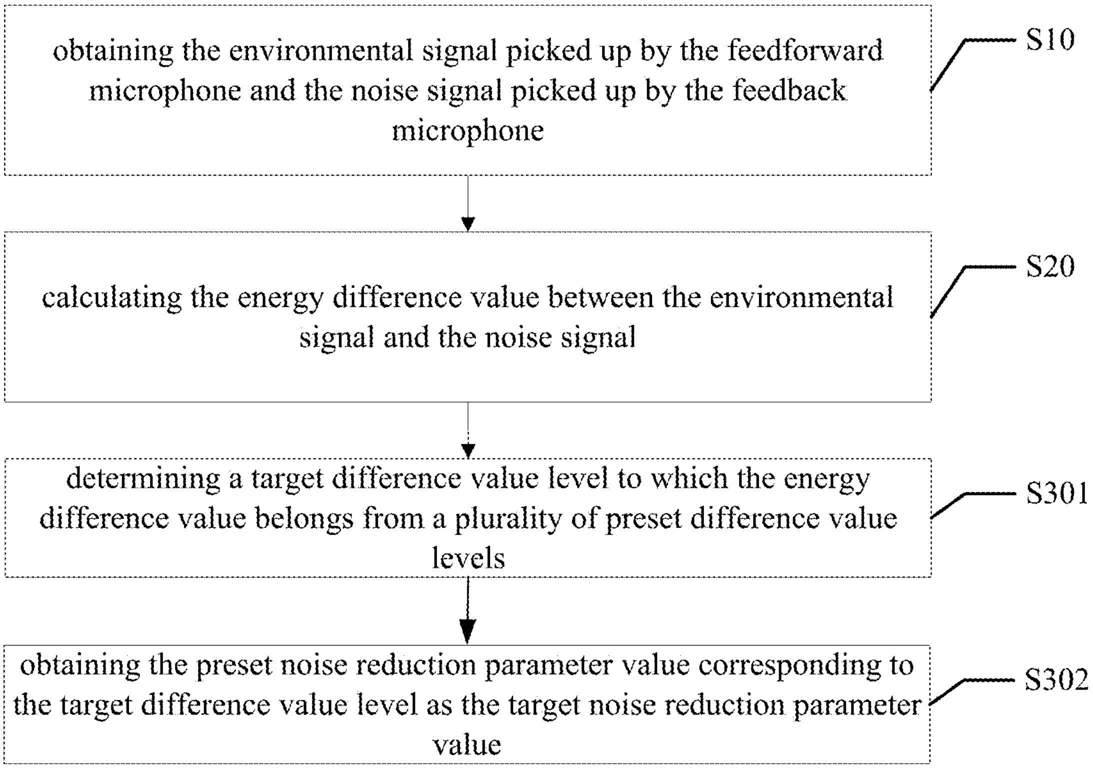
FIG. 3 is a schematic flow chart of a noise reduction parameter setting method according to a second embodiment of the present application.

Furthermore, based on the above first embodiment, the noise reduction parameter setting method according to a second embodiment of the present application is proposed. In this embodiment, as shown in FIG. 3, in step S30, obtaining the preset target noise reduction parameter corresponding to the energy difference value includes:

step S301, determining a target difference value level to which the energy difference value belongs from a plurality of preset difference value levels.

The earphone device can be set with difference value levels used to divide the energy difference value. Different difference value levels can correspond to different difference value intervals. For example, if a range from 0 to 100 is divided into 10 levels, the intervals corresponding to the 10 levels can be [0, 10), [10, 20), . . . [90, 100] respectively. In a specific implementation, the span of the difference value interval corresponding to the difference value level can be set as needed. The smaller the span, the higher the adjustment accuracy of the noise reduction parameter. The larger the span, the lower the adjustment accuracy of the noise reduction parameter. The earphone device compares the energy difference with the difference value interval corresponding to each difference value level to determine which difference value interval the energy difference belongs to, and determines the difference value level to which the energy difference belongs from multiple difference value levels (hereinafter referred to as the target difference value level for distinction).

Step S302, obtaining the preset noise reduction parameter value corresponding to the target difference value level as the target noise reduction parameter value.

The noise reduction parameter values corresponding to different difference value levels can be preset in the earphone device. In the experimental design stage, the coupling state between the earphone device and the test ear can be adjusted so that the energy difference value between the environmental signal and the noise signal reaches different difference value levels, and then the optimal noise reduction parameter value can be set through experimental test for different difference value levels. The correspondence between the difference value level and the noise reduction parameter value is built into the earphone device. After the earphone device obtains the actual energy difference, it can obtain the noise reduction parameter value corresponding to the energy difference according to the built-in correspondence, and use the obtained noise reduction parameter value as the target noise reduction parameter value.

Figure 4:
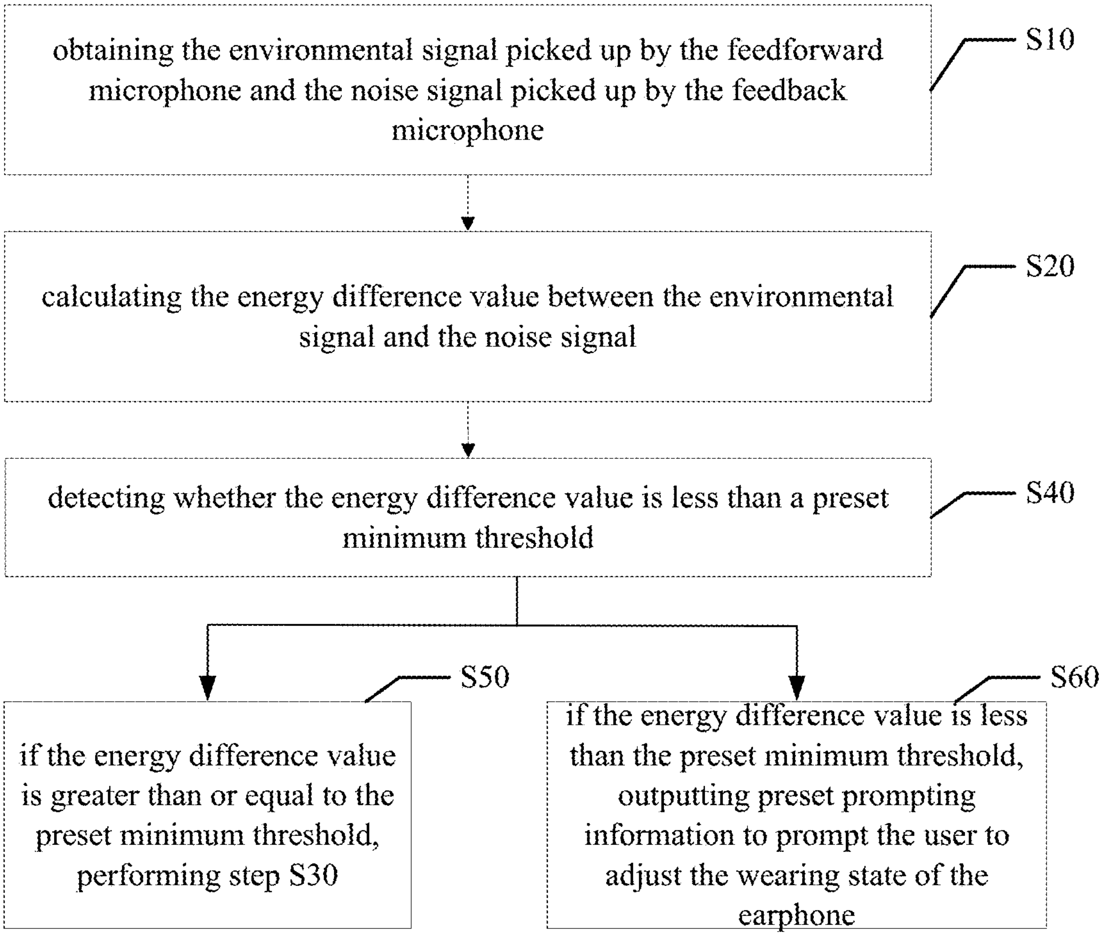
FIG. 4 is a schematic flow chart of a noise reduction parameter setting method according to another embodiment of the present application.

Further, in another embodiment, as shown in FIG. 4, after step S20, the method also includes:

step S40, detecting whether the energy difference is less than a preset minimum threshold.

When the user does not wear earphones or does not wear earphones properly, the coupling degree between the earphone device and the user's ear canal will be very low, and the energy difference value between the environmental signal and the noise signal will be small. At this time, the active noise reduction mode is started, it may happen that the active noise reduction effect is very poor no matter how the noise reduction parameters are adjusted.

In this regard, after the earphone device calculates the energy difference value between the environmental signal and the noise signal, it can detect whether the energy difference is less than the preset minimum threshold. The preset minimum threshold is a threshold set in advance according to needs.

Step S50, if the energy difference is greater than or equal to the preset minimum threshold, performing step S30.

When the energy difference is greater than or equal to the preset minimum threshold, it means that the coupling degree between the earphone device and the user's ear canal has reached the minimum standard of the active noise reduction mode. At this time, the earphone device can perform step S30, that is, obtain the preset target noise reduction parameter corresponding to the energy difference, and set the noise reduction parameter for the active noise reduction mode of the earphone device according to the target noise reduction parameter.

Step S60, if the energy difference is less than the preset minimum threshold, outputting preset prompting information to prompt the user to adjust the wearing state of the earphone.

When the energy difference is less than the preset minimum threshold, it means that the coupling degree between the earphone device and the user's ear canal has not reached the minimum standard of the active noise reduction mode. At this time, the earphone device can output the preset prompting information. The preset prompting information can be prompting information used to prompt the user to adjust the wearing state of the earphone, for example, prompt the user to wear the earphones again or prompt the user to replace the earmuffs. The output method of the preset prompting information is not limited in this embodiment. For example, the prompt sound can be played through the speaker of the earphone device, or the prompting information can be displayed through the display screen of the user terminal connected to the earphone device.

Further, in an embodiment, when the earphone device sets the preset minimum threshold, the minimum value of the difference value interval corresponding to the difference value level set in the earphone device can be set to the preset minimum threshold. In another embodiment, an optimal threshold can also be set in the earphone device. When the energy difference is greater than or equal to the optimal threshold, it means that the coupling degree between the earphone device and the user's ear canal is very high, and the noise reduction parameter value can be set for the energy difference greater than the optimal threshold. That is, the difference value interval corresponding to one of the difference value levels can be set to [optimal threshold, infinity], which can be divided into multiple levels between the optimal threshold and the preset minimum threshold, the more levels there are, the higher the adjustment accuracy.

Figure 5:
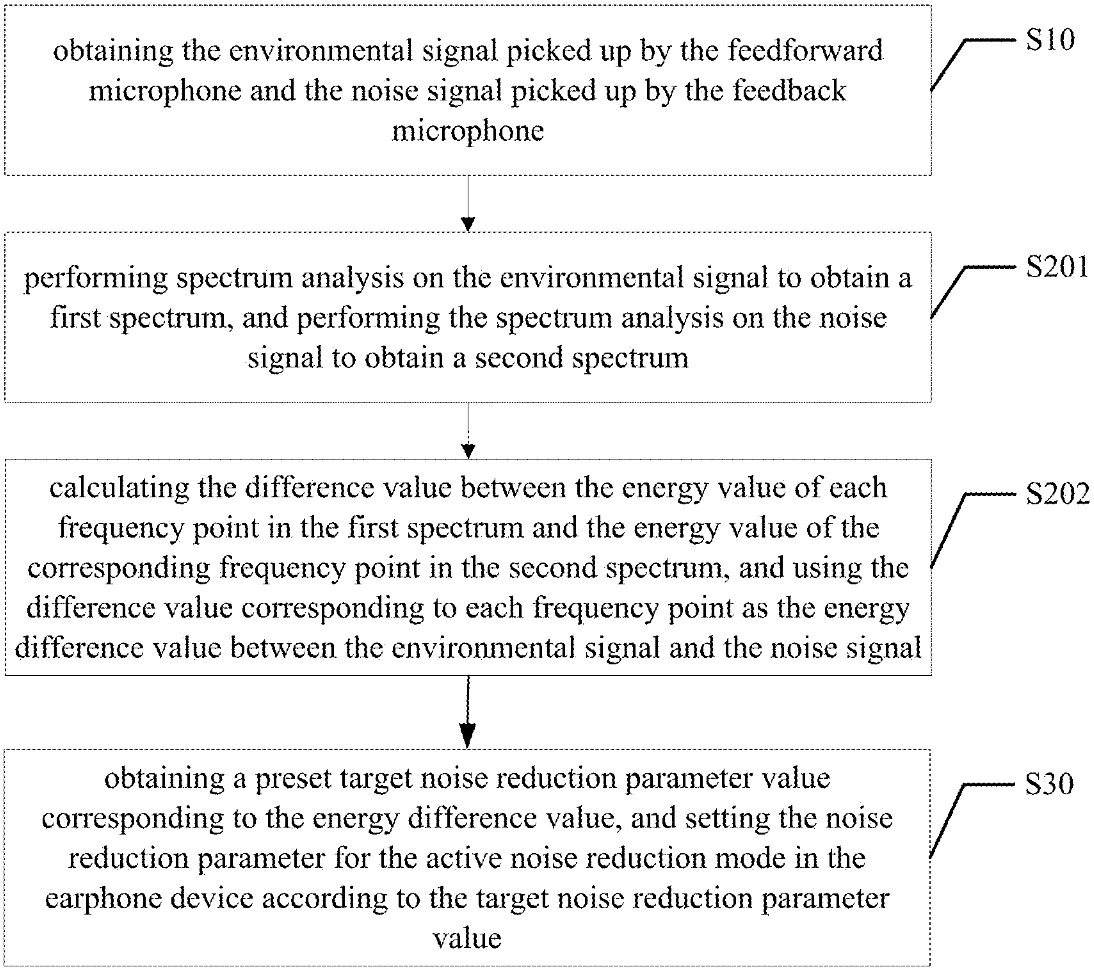
FIG. 5 is a schematic flow chart of a noise reduction parameter setting method according to a third embodiment of the present application.

Further, based on the above-mentioned first and/or second embodiment, the noise reduction parameter setting method according to a third embodiment of the present application is proposed. As shown in FIG. 5, the step S20 includes:

step S201, performing spectrum analysis on the environmental signal to obtain a first spectrum, and performing the spectrum analysis on the noise signal to obtain a second spectrum.

In this embodiment, the earphone device calculates the energy difference value between the environmental signal and the noise signal. Specifically, the spectrum analysis is performed on the environmental signal to obtain the spectrum of the environmental signal (hereinafter referred to as the first spectrum), and the spectrum analysis is performed on the noise signal to obtain the spectrum of the noise signal (hereinafter referred to as the second spectrum). The spectrum includes energy values corresponding to each frequency point. The unit of the energy value can be decibels. The specific process of spectrum analysis will not be described in detail here.

Step S202, calculating the difference value between the energy value of each frequency point in the first spectrum and the energy value of the corresponding frequency point in the second spectrum, and using the difference value corresponding to each frequency point as the energy difference value between the environmental signal and the noise signal.

After the earphone device obtains the first spectrum and the second spectrum, it can respectively calculate the difference value between the energy value of each frequency point in the first spectrum and the energy value of the corresponding frequency point in the second spectrum. That is, for each frequency point, the difference value between the energy value of the frequency point taken from the first spectrum and the energy value of the frequency point taken from the second spectrum is calculated. After calculating each frequency point, the difference values corresponding to each frequency point can be obtained and is used as the energy difference value between the environmental signal and the noise signal.

When the energy difference value includes the difference value corresponding to each frequency point, there are many ways to determine whether the energy difference value is less than the preset minimum threshold, which is not limited in this embodiment. For example, in an embodiment, the preset minimum threshold can be set to include only one threshold. The earphone device determines whether the difference values corresponding to the frequency points are less than the threshold. If they are all less than the threshold, it is determined that the energy difference value is less than the preset minimum threshold, and the preset prompting information is output to prompt the user to adjust the wearing state of the earphones.

Figure 6:
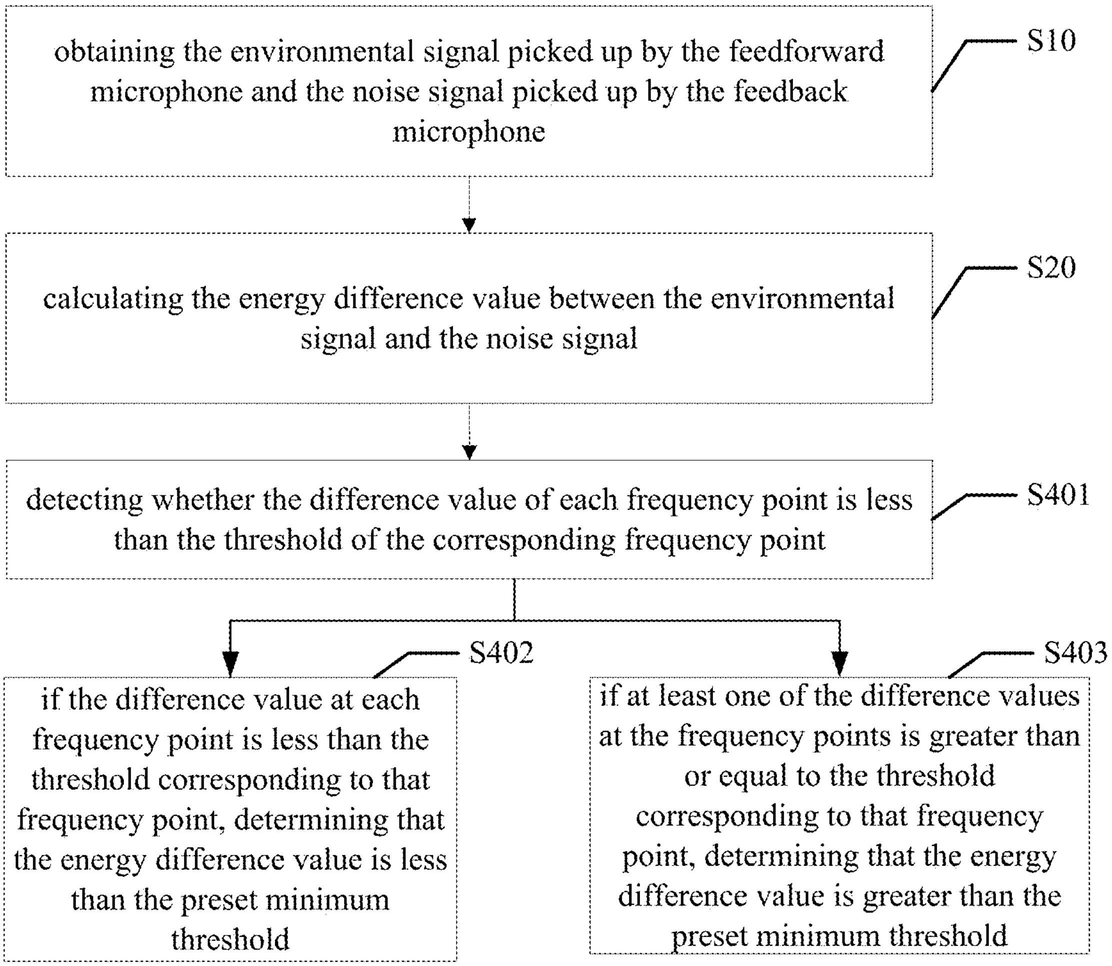
FIG. 6 is a schematic flow chart of a noise reduction parameter setting method according to another embodiment of the present application.

In another embodiment, as shown in FIG. 6, step S40 includes:

step S401, detecting whether the difference value of each frequency point is less than the threshold of the corresponding frequency point.

The preset minimum threshold can be set to include the threshold corresponding to each frequency point. The earphone device can detect whether the difference value between each frequency point is less than the threshold of the corresponding frequency point. That is, for each frequency point, the difference value corresponding to the frequency point is compared with the threshold corresponding to that frequency point;

step S402, if the difference value at each frequency point is less than the threshold corresponding to that frequency point, determining that the energy difference value is less than the preset minimum threshold; and step S403, if at least one of the difference values at the frequency points is greater than or equal to the threshold corresponding to that frequency point, determining that the energy difference value is greater than the preset minimum threshold.

If the difference values at the frequency points are less than the threshold of the corresponding frequency point, the earphone device can determine that the energy difference value is less than the preset minimum threshold. If at least one of the difference values at the frequency points is greater than or equal to the threshold of the corresponding frequency point, the earphone device can determine that the energy difference value is greater than the preset minimum threshold. By setting thresholds corresponding to different frequency points and comparing the difference values at different frequency points with the thresholds, the detection of the coupling state of the earphone device and the user's ear canal is more accurate, thereby making the set noise reduction parameters more precise.

In other embodiments, it can also be configured as needed to determine that the energy difference value is less than the preset minimum threshold when the difference value at at least one frequency point is less than the threshold of the corresponding frequency point.

When the energy difference value includes the difference values corresponding to the frequency points, there can be many ways to determine the target difference value level to which the energy difference value belongs from the multiple preset difference value levels, which is not limited in this embodiment. For example, in an embodiment, the difference value level can be set for only one frequency point as needed, the difference value level to which the difference value of the frequency point belongs in the energy difference value is determined, and the difference value level is used as the difference value level corresponding to the energy difference value.

Figure 7:
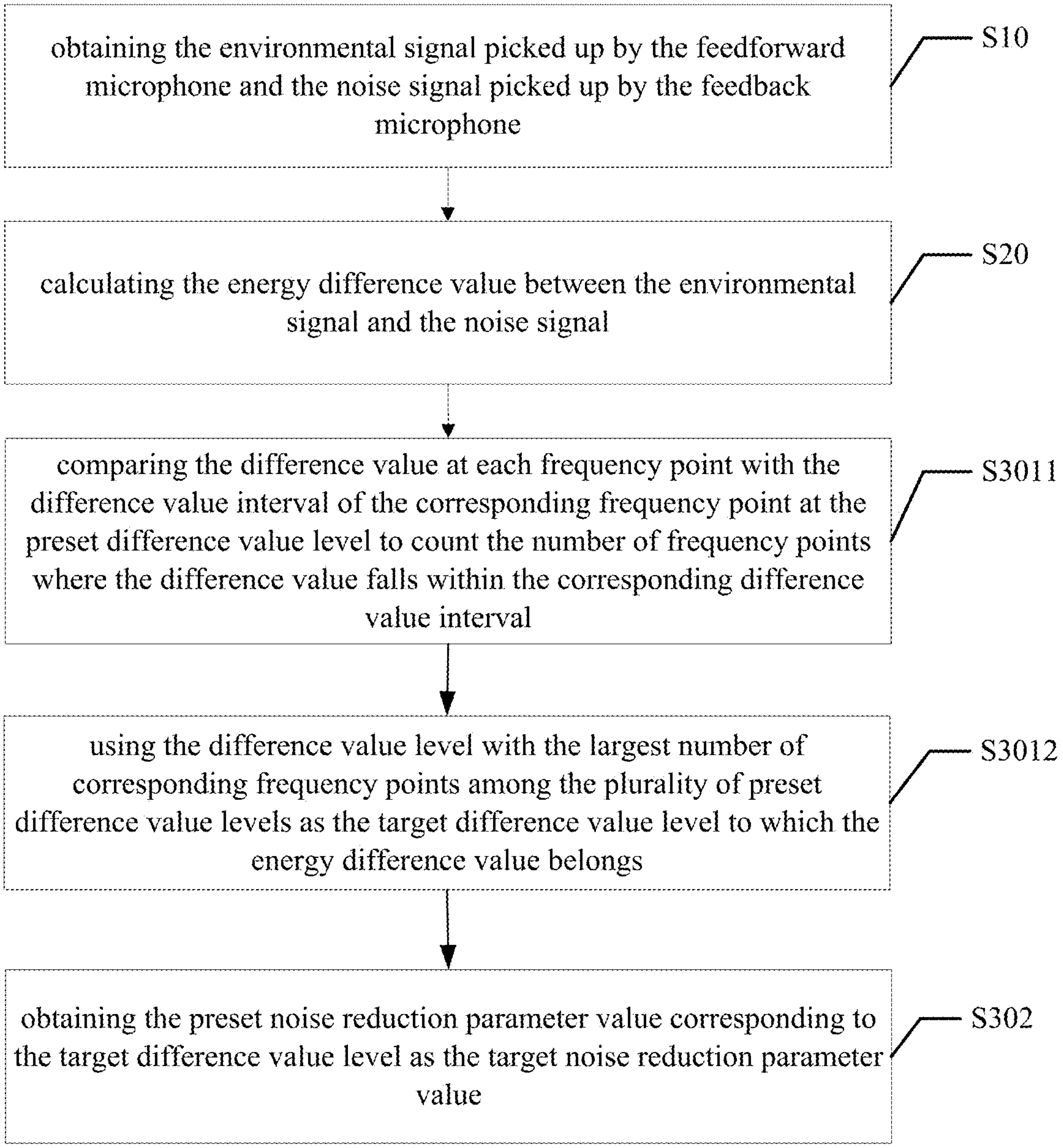
FIG. 7 is a schematic flow chart of a noise reduction parameter setting method according to another embodiment of the present application.

In another embodiment, as shown in FIG. 7, the step S301 includes:

step S3011, comparing the difference value at each frequency point with the difference value interval of the corresponding frequency point at the preset difference value level to count the number of frequency points where the difference value falls within the corresponding difference value interval.

Under one difference value level, the difference value interval of each frequency point can be set, and the difference value interval for each frequency point may be different. After obtaining the difference value of each frequency point, the earphone device compares the difference value with the difference value interval of each difference value level. Specifically, when comparing with the difference value interval of one difference value level, the difference value at each frequency point is compared with the difference value interval of the corresponding frequency point in the difference value level. The difference values of some frequency points may be falling into the corresponding difference value interval, the difference values of some frequency points may not fall within the corresponding difference value interval. The earphone device can count the number of frequency points falling into the corresponding difference value interval (hereinafter referred to as the number of frequency points). Assuming that there are N frequency points, the number of statistically obtained frequency points may be 0 to N.

Step S3012, using the difference value level with the largest number of corresponding frequency points among the plurality of preset difference value levels as the target difference value level to which the energy difference value belongs.

After comparing the difference value of each frequency point with the difference value interval of each difference value level, the earphone device obtains the number of frequency points corresponding to each difference value level. The earphone device can use the difference value level with the largest number of corresponding frequency points as the target difference value level to which the energy difference value belongs. By setting the difference value intervals corresponding to different frequency points under each difference value level, and comparing the difference value at each frequency point with the difference value interval for the corresponding frequency point under the difference value level, the energy difference value between the environmental signal and the noise signal picked up by the earphone device can be more accurately matched to the preset difference value level, which can make the set noise reduction parameters more accurate.

Figure 8:
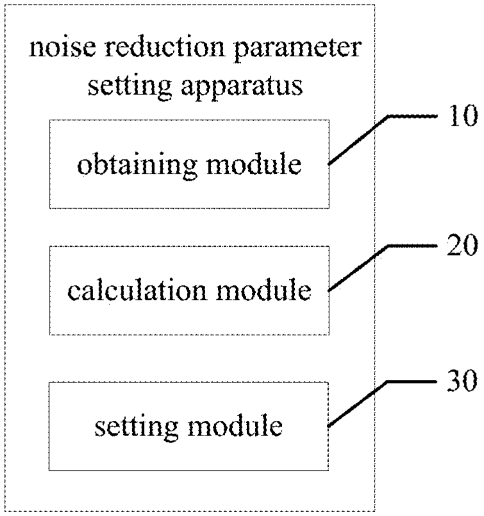
FIG. 8 is a schematic diagram of functional modules of the noise reduction parameter setting apparatus according to another embodiment of the present application.

In addition, the embodiment of the present application also proposes a noise reduction parameter setting apparatus. Referring to FIG. 8, the apparatus is provided on the earphone device. The earphone device includes a feedforward microphone and a feedback microphone. The apparatus includes an acquisition module 10, a calculation module 20 and a setting module 30.

The acquisition module 10 is configured to acquire the environmental signal picked up by the feedforward microphone and the noise signal picked up by the feedback microphone.

The calculation module 20 is configured to calculate the energy difference value between the environmental signal and the noise signal.

The setting module 30 is configured to obtain a preset target noise reduction parameter value corresponding to the energy difference value, and set the noise reduction parameter for the active noise reduction mode in the earphone device according to the target noise reduction parameter value.

Further, the acquisition module 10 includes a determination unit configured to determine the target difference value level to which the energy difference value belongs from a plurality of preset difference value levels; and an obtaining unit configured to obtain the preset noise reduction parameter value corresponding to the target difference value level as the target noise reduction parameter value.

Further, the apparatus also includes a first detection module configured to detect whether the energy difference value is less than a preset minimum threshold; and an output module configured to output preset prompting information to prompt the user to adjust the wearing state of the earphone if the energy difference value is less than the preset minimum threshold.

The setting module 30 is also configured to obtain a preset target noise reduction parameter value corresponding to the energy difference value if the energy difference value is greater than or equal to the preset minimum threshold. The noise reduction parameter for the active noise reduction mode in the earphone device is set according to the target noise reduction parameter value.

Further, the calculation module 20 includes an analysis unit configured to perform spectrum analysis on the environmental signal to obtain a first spectrum, and perform spectrum analysis on the noise signal to obtain a second spectrum; and a calculation unit configured to calculate the difference value between the energy value of each frequency point in the first spectrum and the energy value of the corresponding frequency point in the second spectrum, and use the difference value corresponding to each frequency point as the energy difference value between the environmental signal and the noise signal.

Further, the preset minimum threshold includes the threshold corresponding to each frequency point, and the first detection module includes a detection unit configured to respectively detect whether the difference value of each frequency point is less than the threshold of the corresponding frequency point; a first determination unit configured to determine that the energy difference value is less than the preset minimum threshold if the difference value at each frequency point are less than the threshold of the corresponding frequency point; and a second determination unit configured to determine that the energy difference value is greater than the preset minimum threshold if at least one of the difference values at the frequency points is greater than or equal to the threshold of the corresponding frequency point.

Further, the determining unit includes a comparison subunit configured to compare the difference value of each frequency point with the difference value interval of the corresponding frequency point under the preset difference value level to count the number of frequency points where the difference values fall into the corresponding difference value interval; and a determination subunit configured to use the difference value level with the largest number of corresponding frequency points among the plurality of preset difference value levels as the target difference value level to which the energy difference value belongs.

Further, the acquisition module 10 is also configured to acquire collection values of multiple contact sensors provided on the earphone wearing part of the earphone device.

The apparatus also includes a second detection module configured to detect whether each of the collection values is greater than the preset threshold.

The acquisition module 10 is also configured to acquire the environmental signal picked up by the feedforward microphone and the noise signal picked up by the feedback microphone if at least one of the collection values is greater than the preset threshold.

The expanded content of the specific implementation of the noise reduction parameter setting apparatus of the present application is basically the same as the above embodiments of the noise reduction parameter setting method, and will not be described again here.

The earphone device of the present application includes a structural housing, a communication module, a main control module (such as a micro control unit MCU), a speaker, a feedforward microphone, a feedback microphone, a memory, etc. The main control module can include a microprocessor, an audio decoding unit, a power supply and a power management unit, sensors and other active or passive components required by the system (can be replaced, deleted or added according to the actual function), to realize wireless audio reception and playback functions. The earphone device can establish communication connections with the user terminal and other earphone devices through the communication module. The earphone communication program can be stored in the memory of the earphone, and the microprocessor can be configured to call the earphone communication program stored in the memory and perform the following operations:

obtaining the environmental signal picked up by the feedforward microphone and the noise signal picked up by the feedback microphone;

calculating the energy difference value between the environmental signal and the noise signal; and obtaining a preset target noise reduction parameter value corresponding to the energy difference value, and setting the noise reduction parameter for the active noise reduction mode in the earphone device according to the target noise reduction parameter value.

Further, obtaining the preset target noise reduction parameter value corresponding to the energy difference value includes:

determining the target difference value level to which the energy difference value belongs from a plurality of preset difference value levels; and obtaining the preset noise reduction parameter value corresponding to the target difference value level as the target noise reduction parameter value.

Further, after calculating the energy difference value between the environmental signal and the noise signal, the microprocessor can also be used to call the earphone communication program stored in the memory to perform the following operations:

detecting whether the energy difference value is less than the preset minimum threshold;

if the energy difference value is greater than or equal to the preset minimum threshold, obtaining the preset target noise reduction parameter value corresponding to the energy difference value, and setting the noise reduction parameter for the active noise reduction mode in the earphone device according to the target noise reduction parameter value; and if the energy difference value is less than the preset minimum threshold, outputting preset prompting information to prompt the user to adjust the wearing state of the earphone.

Further, calculating the energy difference value between the environmental signal and the noise signal includes:

performing spectrum analysis on the environmental signal to obtain the first spectrum, and performing spectrum analysis on the noise signal to obtain the second spectrum; and calculating the difference value between the energy value of each frequency point in the first spectrum and the energy value of the corresponding frequency point in the second spectrum respectively, and using the difference value corresponding to each frequency point as the energy difference value between the environmental signal and the noise signal.

Further, the preset minimum threshold includes the threshold corresponding to each frequency point, and detecting whether the energy difference value is less than the preset minimum threshold includes:

detecting whether the difference value of each frequency point is less than the threshold of the corresponding frequency point;

if the difference value at each frequency point is less than the threshold of the corresponding frequency point, determining that the energy difference value is less than the preset minimum threshold; and if at least one of the difference values at the frequency points is greater than or equal to the threshold of the corresponding frequency point, determining that the energy difference value is greater than the preset minimum threshold.

Further, determining the target difference value level to which the energy difference value belongs from a plurality of preset difference value levels includes:

comparing the difference value of each frequency point with the difference value interval of the corresponding frequency point at the preset difference value level to count the number of frequency points where the difference values fall within the corresponding difference value interval; and using the difference value level with the largest number of corresponding frequency points among the plurality of preset difference value levels as the target difference value level to which the energy difference value belongs.

Further, before obtaining the environmental signal picked up by the feedforward microphone and the noise signal picked up by the feedback microphone, the microprocessor can also be used to call the earphone communication program stored in the memory to perform the following operations:

obtaining collection values of multiple contact sensors provided on the earphone wearing part of the earphone device;

detecting whether each of the collection values is greater than the preset threshold;

if at least one of the collection values is greater than the preset threshold, obtaining the environmental signal picked up by the feedforward microphone and the noise signal picked up by the feedback microphone.

For various embodiments of the earphone device and computer-readable storage medium of the present application, reference can be made to the various embodiments of the noise reduction parameter setting method of the present application, which will not be described again here.

It should be noted that, as used herein, the terms “include”, “comprise” or any other variation thereof are intended to cover a non-exclusive inclusion, such that a process, method, article or system that includes a list of elements not only includes those elements, but also includes other elements that are not explicitly listed or elements that are inherent to the process, method, article or system. Without further limitations, an element defined by the statement “includes a . . . ” does not exclude the presence of other identical elements in the process, method, article, or system that includes that element.

The above serial numbers of the embodiments of the present application are only for description and do not represent the advantages or disadvantages of the embodiments.

Through the above description of the embodiments, those skilled in the art can clearly understand that the methods of the above embodiments can be implemented by means of software and the necessary general hardware platform, of course, also by hardware, but in many cases the former is better implementation. Based on this understanding, the technical solution of the present application essentially, or the part that contributes to the related art, can be embodied in the form of a software product. The computer software product is stored in a storage medium (such as ROM/RAM, magnetic disk, optical disk) as described above, including several instructions to cause a terminal device (which can be a mobile phone, computer, server, air conditioner, or network device, etc.) to execute the methods described in various embodiments of the present application.

The above are only some embodiments of the present application, and do not limit the scope of the present application. Under the concept of the present application, equivalent structural transformations or equivalent process transformations made by using the contents of the description and drawings of the present application, or directly/indirectly applied in other relevant technical fields, are included in the scope of the present application.

What is claimed is:

1. A noise reduction parameter setting method, applied to an earphone device comprising a feedforward microphone and a feedback microphone, comprising:

obtaining an environmental signal picked up by the feedforward microphone and a noise signal picked up by the feedback microphone;

calculating an energy difference value between the environmental signal and the noise signal; and obtaining a preset target noise reduction parameter value corresponding to the energy difference value, and setting a noise reduction parameter for an active noise reduction mode in the earphone device according to the target noise reduction parameter value;

wherein obtaining the preset target noise reduction parameter value corresponding to the energy difference value comprises:

determining a target difference value level to which the energy difference value belongs from a plurality of preset difference value levels; and obtaining a preset noise reduction parameter value corresponding to the target difference value level as the target noise reduction parameter value;

wherein after calculating the energy difference value between the environmental signal and the noise signal, the method further comprises:

detecting whether the energy difference value is less than a preset minimum threshold;

obtaining the preset target noise reduction parameter value corresponding to the energy difference value, and setting the noise reduction parameter for the active noise reduction mode in the earphone device according to the target noise reduction parameter value, in response to that the energy difference value is greater than or equal to the preset minimum threshold; or outputting preset prompting information to prompt a user to adjust a wearing state of an earphone, in response to that the energy difference value is less than the preset minimum threshold.

2. The noise reduction parameter setting method of claim 1, wherein calculating the energy difference value between the environmental signal and the noise signal comprises:

performing spectrum analysis on the environmental signal to obtain a first spectrum, and performing the spectrum analysis on the noise signal to obtain a second spectrum; and calculating a difference value between an energy value of each frequency point in the first spectrum and an energy value of a corresponding frequency point in the second spectrum respectively, and using the difference value corresponding to each frequency point as the energy difference value between the environmental signal and the noise signal.

3. The noise reduction parameter setting method of claim 2, wherein the preset minimum threshold comprises a threshold corresponding to each frequency point, and detecting whether the energy difference value is less than the preset minimum threshold comprises:

detecting whether the difference value of each frequency point is less than the threshold of the corresponding frequency point;

in response to that the difference value at each frequency point is less than the threshold of the corresponding frequency point, determining that the energy difference value is less than the preset minimum threshold; or in response to that at least one of the difference values at the frequency points is greater than or equal to the threshold of corresponding one of the frequency points, determining that the energy difference value is greater than the preset minimum threshold.

4. The noise reduction parameter setting method of claim 2, wherein determining the target difference value level to which the energy difference value belongs from the plurality of preset difference value levels comprises:

comparing the difference value at each frequency point with a difference value interval of the corresponding frequency point at a preset difference value level to count a number of frequency points where the difference value falls within the corresponding difference value interval; and using a difference value level with a largest number of corresponding frequency points among the plurality of preset difference value levels as the target difference value level to which the energy difference value belongs.

5. The noise reduction parameter setting method of claim 1, wherein before obtaining the environmental signal picked up by the feedforward microphone and the noise signal picked up by the feedback microphone, the method further comprises:

obtaining collection values of multiple contact sensors provided on an earphone wearing part of the earphone device;

detecting whether each of the collection values is greater than a preset threshold; and in response to that at least one of the collection values is greater than the preset threshold, obtaining the environmental signal picked up by the feedforward microphone and the noise signal picked up by the feedback microphone.

6. An earphone device, comprising: a memory, a processor and a noise reduction parameter setting program stored in the memory and executable on the processor, wherein the noise reduction parameter setting method of claim 1 is implemented when the noise reduction parameter setting program is executed by the processor.

7. A non-transitory computer-readable storage medium, wherein a noise reduction parameter setting program is stored on the non-transitory computer-readable storage medium, and the noise reduction parameter setting method of claim 1 is implemented when the noise reduction parameter setting program is executed by a processor.

8. A noise reduction parameter setting apparatus, provided in an earphone device comprising a feedforward microphone and a feedback microphone, comprising:

an obtaining module, configured to obtain an environmental signal picked up by the feedforward microphone and a noise signal picked up by the feedback microphone;

a calculation module, configured to calculate an energy difference value between the environmental signal and the noise signal; and a setting module, configured to obtain a preset target noise reduction parameter value corresponding to the energy difference value, and set a noise reduction parameter for an active noise reduction mode in the earphone device according to the target noise reduction parameter value;

wherein obtaining the preset target noise reduction parameter value corresponding to the energy difference value comprises:

determining a target difference value level to which the energy difference value belongs from a plurality of preset difference value levels; and obtaining a preset noise reduction parameter value corresponding to the target difference value level as the target noise reduction parameter value;

wherein after calculating the energy difference value between the environmental signal and the noise signal, the method further comprises:

detecting whether the energy difference value is less than a preset minimum threshold;

obtaining the preset target noise reduction parameter value corresponding to the energy difference value, and setting the noise reduction parameter for the active noise reduction mode in the earphone device according to the target noise reduction parameter value, in response to that the energy difference value is greater than or equal to the preset minimum threshold; or outputting preset prompting information to prompt a user to adjust a wearing state of an earphone, in response to that the energy difference value is less than the preset minimum threshold.

* * * * *